INVENTOR.
WHITNEY MC CORMACK

July 25, 1961  W. McCORMACK  2,993,413
COMBINED ARMAMENT AND SPEED CONTROL MEANS FOR AIRCRAFT
Filed June 4, 1959  2 Sheets-Sheet 2

INVENTOR.
WHITNEY MC CORMACK

United States Patent Office 2,993,413
Patented July 25, 1961

2,993,413
COMBINED ARMAMENT AND SPEED CONTROL MEANS FOR AIRCRAFT
Whitney McCormack, Dallas, Tex., assignor, by mesne assignments, to the United States of America as represented by the Secretary of the Navy
Filed June 4, 1959, Ser. No. 818,236
7 Claims. (Cl. 89—1.7)

The present invention relates to combat aircraft incorporating armament such as rockets, and more particularly to means whereby such armament may be associated with an air brake which is selectively operable to reduce the flight speed of the aircraft.

It is known that armament may be carried by an aircraft in such a manner that it is stowed within the fuselage when not in use, and then extended into the airstream when it is clear of the aircraft body when firing takes place. It is also recognized that the speed of an aircraft may in many cases be advantageously reduced when the armament is being discharged at a target in order to prolong the optimum attack conditions then existing. However, other situations frequently arise where speed reduction is desirable under non-combat circumstances, so it is not feasible to design a speed brake which becomes effective only as a function of armament extension. Still further, maximum speed for evasive purposes may be desired even though the aircraft is in the vicinity of the target and the armament in position for instant discharge. For these reasons, independent control of the two structures is a practical necessity, even though they may often be energized concurrently.

The present invention contemplates an aircraft having within the fuselage thereof an armament carriage or pack, this armament preferably comprising missiles such as rockets but not excluding conventional weapons such as guns or bombs. This carriage is arranged to be selectively extendable into the adjacent airstream so that the armament, when in firing position, is clear of the fuselage and can be discharged without any interference with the structural portions of the aircraft. Mounted on this armament carriage is a speed brake unit which fits within a recess in the surface of the carriage and is movable outwardly into the airstream at any time regardless of whether the carriage is in extended or retracted position. A hydraulically powered control mechanism is located within the body of the aircraft and serves to operate the armament carriage and the speed brake either individually or as a unit, this actuating mechanism being so designed that extension of the armament carriage alone automatically and concurrently moves the air brake structure so as not to disturb the relative angular position of these elements as it existed prior to carriage extension. Expressed differently, the armament carriage-speed brake angular relationship remains the same when the former alone is actuated, regardless of what this angular relationship might have been at the instant such actuation began.

One object of the present invention, therefore, is to provide a combined armament carriage and speed control means for combat aircraft.

Another object of the invention is to provide, in a device of the nature described, means whereby each member may be operated independently of the other, and yet the angular relationship therebetween held constant to maintain a previously-selected braking effect when the armament carriage alone is either extended or retracted.

A further object of the invention is to provide a hydraulically-powered control mechanism adapted to perform selective extension and retraction of an aircraft armament carriage and a speed brake either individually or as a unit.

Other objects and many of the attendant advantages of this invention will be readily appreciated as the same becomes better understood by reference to the following detailed description when considered in connection with the accompanying drawings wherein.

Figures 1, 2:
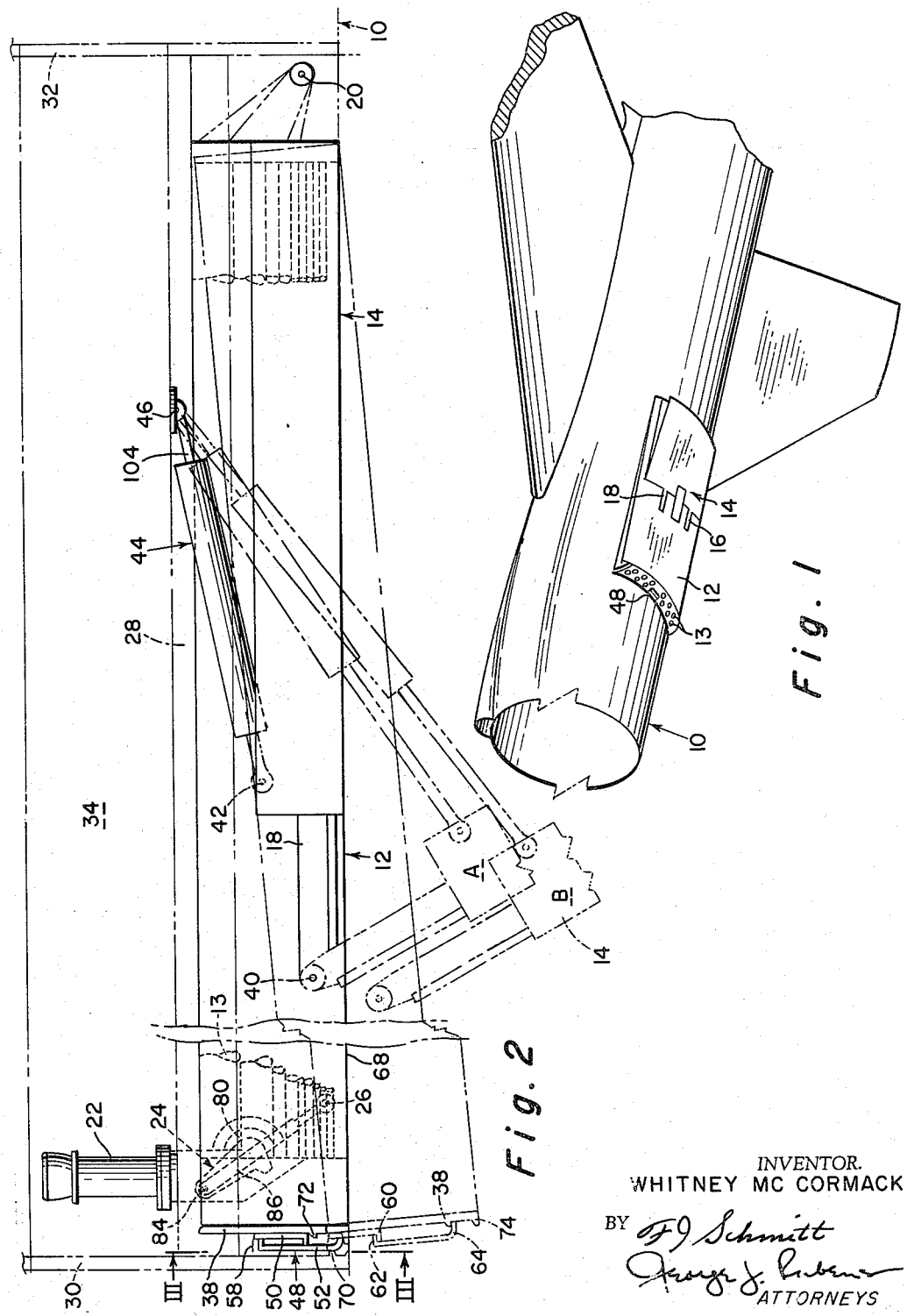
FIG. 1 is a perspective view of a portion of an aircraft incorporating a combined armament carriage and speed control means designed in accordance with a preferred embodiment of the present invention.
FIG. 2 is a side view of a portion of the fuselage of the aircraft of FIG. 1, showing the details of the combined armament carriage and speed control mechanism.

Referring now to FIG. 1, there is shown an aircraft having a fuselage 10, the lower portion of which incorporates a flush-mounted armament carriage, generally indicated by the reference numeral 12, which is designed to carry such armament as the rockets 13. The latter are preferably arranged so that they may be fired individually by some form of electrically-controlled means which forms no part of the present invention. It has accordingly not been illustrated in the drawing. The carriage 12 is hinged near its aft end to some portion of the aircraft such as the fuselage 10, and is illustrated in the drawing in a slightly extended position. It supports a flush-mounted flap or speed brake 14 having two forwardly-extending arms 16, 18 which are pivotally attached to the armament carriage by means which will presently be described.

In FIG. 2 is shown a portion of the aircraft of FIG. 1, with the armament carriage 12 illustrated by solid lines in retracted position and by broken lines in extended position below the surface of fuselage 10. The speed brake unit 14 is similarly shown by solid lines as being flush with the armament carriage 12, and by broken lines as extended from each of the two positions of the latter. The armament carriage is preferably located near the center of balance of fuselage 10, and at its aft end is pivotally attached to the fuselage at two laterally-opposed points, the left-hand one of which is designated by the reference numeral 20. The right-hand pivot point is similar but not illustrated. The fore portion of the armament carriage 12 is pivotally attached to an actuating mechanism consisting of a hydraulic cylinder 22 supported by fuselage 10 and operatively associated with a crank assembly generally designated at 24. This crank assembly 24 is pivotally secured at 26 to the armament carriage so that selective admission of fluid to cylinder 22 operates to extend the carriage to a position such as shown in FIG. 2 by the broken lines. The manner in which such movement is brought about will hereinafter be described in connection with the hydraulic system set forth in FIG. 4 of the drawings. The armament carriage 12, when in retracted position, is housed within a chamber 28 located in the underside of the aircraft fuselage 10, the chamber 28 being bounded by a forward bulkhead 30 and an aft bulkhead 32. Chamber 28 extends the length of, and is slightly deeper than the armament carriage 12. A major structural member, or keel, 34 runs longitudinally of the aircraft the length of chamber 28 along the top thereof, and is rigidly attached to both the forward bulkhead 30 and the aft bulkhead 32. When the armament carriage 12 is in retracted position, the keel 34 fits within a groove formed in the top of the carriage. An opening 36 (FIG. 3) is provided in the armament carriage forward bulkhead 38 for this purpose.

Located in the aft section of the armament carriage 12, the speed brake 14 has forwardly-extending arms 16, 18 (only the left-hand arm 18 being visible in FIG. 2) which are pivotally mounted at 40 on structural members (not shown) of the carriage. Aft of this pivot point 40, the brake 14 is pivotally secured at 42 to the lower end of a hydraulic cylinder 44 the upper end of which is pivoted at 46 to the keel 34. As will be described in connection with FIG. 4, the brake 14 is selectively extended by entry of hydraulic fluid into the cylinder 44. To maintain the effectiveness of the speed brake when the armament carriage is moved into the airstream from a retracted position, the cylinder 44 extends as the cylinder 22 extends to lower the armament carriage, as indicated by the two broken line showings of the brake 14 respectively identified as positions A and B in the drawing.

A telescoping flame shield, generally identified at 48, is composed of two rectangular plates 50 and 52 composed of suitable heat-resistant material. The shield 48 is designed to completely cover, with a slight overlap, the opening 36 in the armament carriage forward bulkhead 38 through which the keel 34 passes when the carriage is in retracted position. The purpose of the flame shield 48 is to preclude rocket exhaust from entering chamber 28 (as well as other exposed interior parts of the fuselage) through this opening 36.

Figure 3:
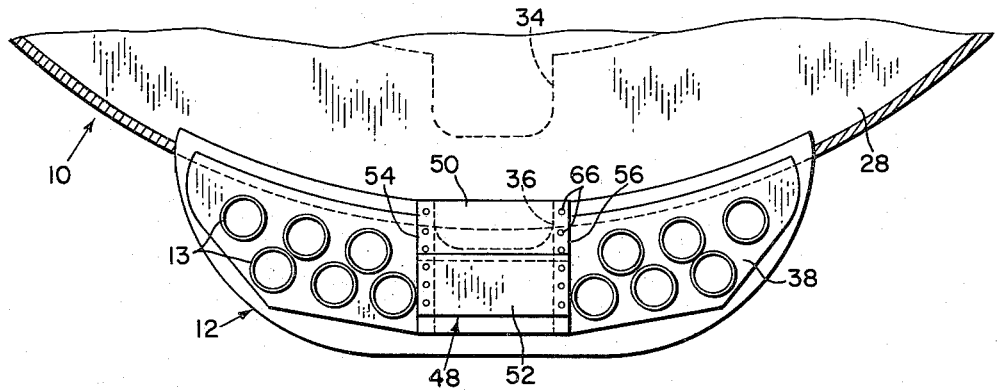
FIG. 3 is a front view of a portion of FIG. 2 taken along the line 3—3.

The shield 48 is disposed vertically on the forward surface of the bulkhead 38 as an integral part of the carriage structure, with the lower plate 52 mounted ahead of, and overlapping, the upper plate 50. These two plates are slidably mounted between guides 54, 56 (FIG. 3). The flame shield plate 50 has along its upper edge a flexible seal 58 protruding forwardly, and on its lower edge a forwardly-projecting flange 60 acting as a stop element. The plate 52 has on its upper edge a rearwardly-projective flange 62, while the lower edge of plate 52 is formed with a rearwardly-curved configuration 64 acting, as will later appear, as a sealing device similar in function to that of the upper seal 58.

FIG. 3 is a front view of the armament carriage 12 in extended position, showing in broken lines the location of the center opening 36 in the forward bulkhead 38, this opening 36 being covered by the extended panels or plates 50, 52 of the flame shield 48. The plates 50, 52 ride in slots (not shown) in the guides 54, 56, the latter being secured to the bulkhead 38 by bolts 66.

To actuate the flame shield 48, the armament carriage 12 is extended below the fuselage surface line 68. The shield assembly moves with the carriage until seal 58 strikes a lip 70 located on the aft edge of the carriage chamber bulkhead 30, this contact between seal 58 and lip 70 terminating downward movement of the plate 50. As the carriage continues to extend, panel 50 moves upward in its guides 54, 56 until its lower stop 60 contacts the upper stop 62 of panel 52. This terminates downward movement of the latter and causes it to be slipped upwardly (relative to the bulkhead 38) in guides 54, 56. When the armament carriage reaches its maximum arc of extension, the lower curved edge 64 of panel 52 contacts a lip 72 formed on the bulkhead 38. This completes the sealing action. When the extended carriage is retracted, a lip 74 located on the forward end of the lower surface of the carriage strikes the curved edge 64 of the panel 52, reversing the movement of panels 50, 52 and retracting the flame shield 48 along with the carriage 12.

In order that the armament carriage 12 may be extended when the speed brake 14 is in retracted position, and to reduce the loss in deflection angle of the speed brake which otherwise would tend to occur when the armament carriage is extended, the length of the speed brake cylinder 44 is increased as a direct function of any outward movement of the carriage. To accomplish this, the cylinder is designed with dual chambers, one of which has a piston actuated by fluid received from the speed brake hydraulic system, and the other of which has a piston actuated by fluid received from the same hydraulic system which operates the armament carriage. Consequently, when the latter is extended, the speed brake is concurrently actuated to compensate for a movement of the latter away from the aircraft fuselage. This maintains a constant angular relationship between speed brake and armament carriage.

Figure 4:
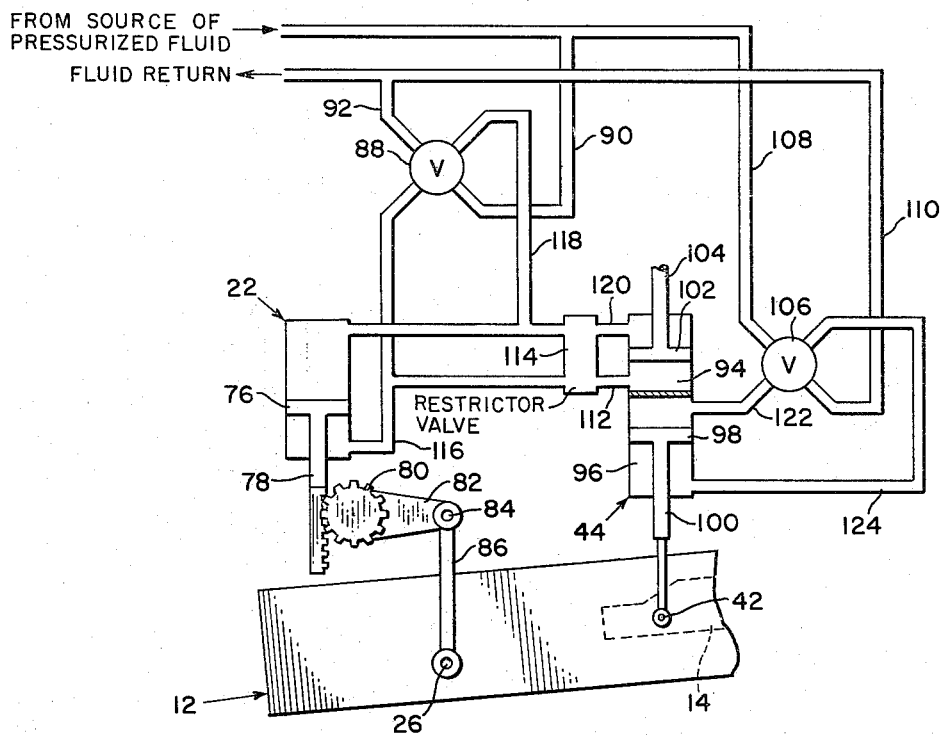
FIG. 4 is a schematic representation of one form of hydraulic system suitable for actuating the armament carriage-speed brake assembly of the present invention.

A preferred form of hydraulic system embodying the above principles is set forth in FIG. 4 of the drawings. It includes the armament carriage actuating cylinder 22 described in connection with FIG. 2, as well as the speed brake actuating cylinder 44. Cylinder 22 incorporates a piston 76 having a shaft 78 connected thereto, the latter having teeth engaging the teeth of a gear 80 forming part of the crank assembly 24. Gear 80 is provided with an arm 82 pivoted at 84 to a further arm 86, the armament carriage being pivotally connected thereto at 26 in the manner illustrated in both FIGS. 2 and 4.

A solenoid-operated selector valve 88 controls the admission of pressurized fluid to cylinder 22, valve 88 being supplied from a source (not shown) through conduit 90. Fluid return is through a line 92.

The speed brake actuating cylinder 44 has an upper chamber 94 and a lower chamber 96. The latter contains a piston 98 having a shaft 100 pivotally attached at 42 to the speed brake 14. The upper chamber 94 of the cylinder 44 contains a piston 102 having a shaft 104 pivotally attached, as previously described in connection with FIG. 2, to the keel 34 at point 46.

A solenoid-operated selector valve 106 controls the admission of pressurized fluid to the lower chamber 96 of the cylinder 44. Valve 106 is connected to the fluid source by conduit 108, fluid return being through line 110.

A hydraulic line 112 leading into the upper chamber 94 of cylinder 44 is restricted by a valve 114 which controls the flow of fluid into and out of chamber 94 for the purpose of maintaining a constant angular relationship between the speed brake and armament carriage as the latter is extended. This restrictor valve 114 prevents actuation of the speed brake cylinder 44 prior to actuation of the carriage cylinder 22, and thus precludes inadvertent opening of the speed brake which otherwise might occur during extension of the carriage. It also prevents damage which might be caused by a faster retraction of the speed brake cylinder during retraction of the carriage.

A feature of the hydraulic system of FIG. 4 is that a number of different extension-retraction combinations of the speed brake and armament carriage are possible. These include (1) extension of the carriage while the brake is retracted, (2) extension of both, (3) extension and retraction of the speed brake independently of the carriage while the latter is retracted, (4) similar action while the carriage is extended, and (5) extension and retraction of the carriage while the brake is extended.

To accomplish the above, fluid flows through conduit 90 to the selector valve 88, which routes the fluid through a line 116 into the lower end of the armament carriage hydraulic cylinder 22, the pressurized fluid urging the piston 76 upward. The force exerted against the fluid contained in the upper end of the cylinder forces such fluid through a line 118 to valve 88 and thence through return conduit 92 to the fluid source. The resulting elevation of piston 76 operates the carriage actuating mechanism or crank assembly 24 to extend the armament carriage to the position shown in FIG. 2 by the broken lines.

Hydraulic fluid which actuates the piston 76 of cylinder 22 simultaneously enters the lower end of chamber 94 of the speed brake actuating cylinder 44 through the line 112, urging piston 102 upward and producing an extension of the cylinder 44 simultaneously with extension of the armament carriage.

Retraction of carriage 12 is brought about by a reversal of the fluid pressures in the system, fluid being routed through line 90 to valve 88 and then through conduit 118 to the upper end of cylinder 22. This urges piston 76 downward to retract the carriage. It also forces fluid from the lower end of the cylinder through line 116 into valve 88 and thence through return line 92 to the source. Fluid enters the line 120 simultaneously with its entrance into cylinder 22, passes through the restrictor valve 114, and enters the upper end of chamber 94 to force piston 102 downward. This progressively shortens the cylinder 44 as the moving armament carriage raises the cylinder attachment point 42.

Independent extension and retraction of the speed brake 14 is effected by energization of the speed brake portion of the hydraulic system to allow fluid to flow from the source through conduit 108 to the selector valve 106, from where it is channeled through line 122 into the upper end of chamber 96 of cylinder 44. This fluid pressure urges piston 98 downward and extends the speed brake 14. To retract the brake, fluid is canneled through selector valve 106 into the lower end of chamber 96 through line 124 to effect an upward movement of piston 98 and consequent retraction of the speed brake.

Obviously many modifications and variations of the present invention are possible in the light of the above teachings. It is therefore to be understood that within the scope of the appended claims the invention may be practiced otherwise than as specifically described.

I claim:

1. In an armament-carrying aircraft, an armament carriage disposed in generally longitudinal relation to the fuselage of said aircraft and within the body thereof when in retracted position, said carriage being hinged at its aft end to said fuselage, a speed brake carried by said armament carriage so as to be flush with the surface thereof when in retracted position, said speed brake being hinged at its fore end to said carriage, means for selectively extending said carriage and said brake each independently of the positional status of the other, the extension of said speed brake when said carriage is in retracted position causing said brake to assume a predetermined angular relationship with said carriage, and means operating upon a subsequent extension of said carriage for maintaining the same predetermined angular relationship between said brake and said carriage that existed prior to carriage extension.

2. In a combat aircraft, an armament carriage disposed in generally longitudinal fashion on the under surface of the aircraft so as to be flush with an aerodynamic surface thereof when in retracted position, hydraulically-controlled means for selectively extending said carriage to place the armament carried thereby in firing position, a speed brake carried by said armament carriage so as to be flush with the surface thereof when in retracted position, hydraulically-controlled means for selectively extending said speed brake without regard to the positional status of the carriage-extending means, and means operative upon a subsequent change in the positional status of said carriage for maintaining the angular relationship that existed between said carriage and said brake prior to the occurrence of such change in carriage position.

3. In a combat aircraft: an armament carriage carried by said aircraft and selectively retractable and extendable into and out of the aircraft fuselage; a speed brake mounted on said armament carriage and selectively extendable into the air stream for aircraft flight control; a hydraulic system, including a source of pressurized fluid, said hydraulic system incorporating a pair of cylinders associated with said carriage and said brake, respectively; means for selectively energizing the brake cylinder to extend said brake; and means for selectively energizing said carriage cylinder to extend said carriage, the energization of said carriage as a function thereof so as to maintain the angular relationship between said carriage and said brake as it existed prior to the energization of said carriage cylinder.

4. The combination of claim 3, in which said brake cylinder is formed with dual chambers, one of which receives pressurized fluid from said source to control the extension of said brake, and the other of which receives pressurized fluid from said source as a function of the reception of fluid by the cylinder associated with said armament carriage.

5. In an armament-carrying aircraft, an armament carriage housed longitudinally in the fuselage of said aircraft so as to be flush with the surface thereof when in retracted position, said aircraft having a structural member extending longitudinally through that portion of said fuselage housing said armament carriage when the latter is in retracted position, said armament carriage being grooved along one longitudinal surface and open at one end thereof to accommodate said structural member, means for extending said carriage from said fuselage into the airstream so as to position the armament carried thereby for firing, and means, operating as a function of the extension of said carriage, for closing the open end of said carriage to said airstream when said carriage is in extended position.

6. The combination of claim 5, in which said means for closing the open end of said carriage when the latter is in extended position includes at least two telescoping plates disposed in face-to-face relation when said carriage is retracted and slidable into edge-to-edge relation as a function of the extension of said carriage.

7. In a combat aircraft, an armament carriage disposed in generally longitudinal fashion on the under surface of the aircraft so as to be flush with an aerodynamic surface thereof when in retracted position, hydraulically-controlled means for selectively extending said carriage to place the armament carried thereby in firing position, a speed brake carried by said armament carriage so as to be flush with the surface thereof when in retracted position, and hydraulically-controlled means for selectively extending said speed brake without regard to the positional status of the carriage-extending means, both said carriage-extending means and said speed-brake-extending means incorporating hydraulic cylinders selectively energized from a common source of pressurized fluid, the hydraulic cylinder associated with said speed brake being energized as a function of the energization of the hydraulic cylinder associated with said armament carriage so as to maintain a preselected angular relationship between said brake and said carriage.

References Cited in the file of this patent

UNITED STATES PATENTS

| | | |
|---|---|---|
| 2,709,947 | Woods | June 7, 1955 |
| 2,749,064 | Kuhlman | June 5, 1956 |

FOREIGN PATENTS

| | | |
|---|---|---|
| 585,564 | Great Britain | Feb. 11, 1947 |